US012338684B2

(12) United States Patent
Lu

(10) Patent No.: US 12,338,684 B2
(45) Date of Patent: Jun. 24, 2025

(54) CHILD-RESISTANT ROLLER BLIND LIFTING FIXING ROD AND USE METHOD THEREOF

(71) Applicant: NINGBO JIESHU WINDOW COVERINGS MANUFACTURING CO. LTD, Yuyao (CN)

(72) Inventor: Jiebing Lu, Yuyao (CN)

(73) Assignee: NINGBO JIESHU WINDOW COVERINGS MANUFACTURING CO. LTD (CN)

( * ) Notice: Subject to any disclaimer, the term of this patent is extended or adjusted under 35 U.S.C. 154(b) by 302 days.

(21) Appl. No.: 17/895,343

(22) Filed: Aug. 25, 2022

(65) Prior Publication Data

US 2024/0003186 A1 Jan. 4, 2024

(30) Foreign Application Priority Data

Jun. 29, 2022 (CN) ......................... 202210759043.2

(51) Int. Cl.
*E06B 9/80* (2006.01)
*E06B 9/42* (2006.01)

(52) U.S. Cl.
CPC . *E06B 9/80* (2013.01); *E06B 9/42* (2013.01)

(58) Field of Classification Search
CPC ..... E06B 9/42; E06B 9/56; E06B 9/32; E06B 9/322; E06B 9/326; E06B 9/78; E06B 2009/3265; E06B 2009/785
See application file for complete search history.

(56) References Cited

U.S. PATENT DOCUMENTS 3,123,182 A * 3/1964 Malone et al. ......... A47H 11/02 188/65.1
5,465,779 A * 11/1995 Rozon ...................... E06B 9/326 160/168.1 V
5,553,653 A * 9/1996 Rozon ...................... E06B 9/326 74/502
5,595,232 A * 1/1997 Benthin .................. E06B 9/361 160/320

(Continued)

FOREIGN PATENT DOCUMENTS

CN 110130819 A * 8/2019 ............... E06B 9/78
CN 212054444 U * 12/2020

(Continued)

*Primary Examiner* — Johnnie A. Shablack
(74) *Attorney, Agent, or Firm* — McDonnell Boehnen Hulbert & Berghoff, LLP

(57) ABSTRACT

The present invention relates to a child-resistant roller blind lifting fixing rod and a use method thereof. The child-resistant roller blind lifting fixing rod includes a guide rail rod body and a lifting handle, where accommodating cavities are disposed on two sides of the guide rail rod body along an axial direction in a cut-through manner; the lifting handle includes a housing slidably sleeved on the guide rail rod body along the axial direction and a first handle control piece and a second handle control piece correspondingly mounted on two sides of the housing, and each of the first handle control piece and the second handle control piece is provided with a triggering end and a clamping portion corresponding to the traction piece of a roller blind. The overall operation of the present invention is safe and reliable, and thus can prevent from being pulled by children.

10 Claims, 16 Drawing Sheets

(56) References Cited

U.S. PATENT DOCUMENTS 5,671,793 A * 9/1997 Lee .......................... E06B 9/322
160/168.1 R
6,196,293 B1 * 3/2001 Lee .......................... E06B 9/303
160/168.1 V
6,516,860 B1 * 2/2003 Weaver ...................... E06B 9/30
160/168.1 R
8,286,686 B2 * 10/2012 Cannaverde ............ E06B 9/326
160/320
8,544,525 B2 * 10/2013 Zhu ........................... E06B 9/56
160/321
8,763,675 B2 * 7/2014 Zhu .......................... E06B 9/324
160/321
8,931,538 B2 * 1/2015 Ho ........................... E06B 9/326
160/168.1 R
8,950,463 B2 * 2/2015 Vestal ...................... E06B 9/322
160/173 R
9,151,110 B2 * 10/2015 Vestal ...................... E06B 9/303
10,006,245 B1 * 6/2018 Marocco .................... E06B 9/78
10,208,535 B2 * 2/2019 Marocco .................... E06B 9/78
10,655,385 B2 * 5/2020 McNeill ................... E06B 9/361
11,105,149 B2 * 8/2021 Marocco .................... E06B 9/78
11,142,945 B2 * 10/2021 Marocco .................... F16H 7/18
11,913,280 B2 * 2/2024 Lynch ...................... E06B 9/322
2012/0285631 A1 * 11/2012 Zhu ........................... E06B 9/32
160/84.01
2019/0195014 A1 * 6/2019 Chua ........................ E06B 9/326
2023/0228147 A1 * 7/2023 Derk, Jr. .................... E06B 9/42
160/321
2023/0265713 A1 * 8/2023 Krantz-Lilienthal ..... E06B 9/78
160/127
2024/0003186 A1 * 1/2024 Lu ............................. E06B 9/42
2024/0271485 A1 * 8/2024 Guerra ..................... E06B 9/326

FOREIGN PATENT DOCUMENTS

EP 2522805 B1 * 10/2013 ............... E06B 9/32
WO WO-2013083996 A2 * 6/2013 ............. E06B 9/326
WO WO-2023226754 A1 * 11/2023

* cited by examiner

CHILD-RESISTANT ROLLER BLIND LIFTING FIXING ROD AND USE METHOD THEREOF

CROSS-REFERENCE TO RELATED APPLICATIONS

This application claims priority to Chinese Patent Application No. 202210759043.2, filed on Jun. 29, 2022, which is incorporated by reference herein in its entirety.

TECHNICAL FIELD

The present invention relates to the technical field of roller blind window decorations, and in particular relates to a child-resistant roller blind lifting fixing rod and a use method thereof.

BACKGROUND ART

A roller blind curtain generally includes a roller blind and roller blind heads mounted on two sides of the roller blind, and the roller blind head at one end is provided with a pull rope or a pull bead chain for adjusting the lifting of the roller blind. The pull rope or pull bead chain is pulled down to drive the roller blind head to rotate, thereby driving the roller blind to rise or fall. Taking the pull rope type as an example, at present, the pull ropes of most of the manual roller blinds on the market are exposed, and the whole pull rope is circular in shape, so that there is a potential safety hazard that children may be hooked to the exposed part of the pull rope while playing. Therefore, it is necessary to design a device that can hide the pull rope or the pull bead chain, can prevent from being pulled by the children, and meanwhile, has a lifting function of the traditional roller blind.

SUMMARY OF THE INVENTION

(I) Technical Problem to Be Solved

The technical problem to be solved by the present invention is to provide a child-resistant roller blind lifting fixing rod, in which a pull rope or a pull bead chain of a roller blind is arranged in a guide rail rod body, and thus a potential safety hazard caused by the fact that a child touches the pull rope or the pull bead chain by mistake can be prevented.

(II) Technical Solutions

In order to solve the above technical problem, the present invention provides a child-resistant roller blind lifting fixing rod, used for connecting an external roller blind head. The lifting fixing rod includes a guide rail rod body and a lifting handle. Accommodating cavities are disposed on two sides of the guide rail rod body along an axial direction in a cut-through manner, a traction piece of the roller blind head is correspondingly placed in the accommodating cavity; the lifting handle includes a housing slidably sleeved on the guide rail rod body along the axial direction and a first handle control piece and a second handle control piece correspondingly mounted on two sides of the housing, and each of the first handle control piece and the second handle control piece is provided with a triggering end and a clamping portion corresponding to the traction piece. When in use, by triggering the triggering end of the first handle control piece or the second handle control piece, the clamping portion clamps the traction piece, and by pulling down the whole lifting handle, the traction piece on the corresponding triggering end side is driven to move downwards, so that counterclockwise or clockwise rotation of the roller blind head is achieved.

Furthermore, a sliding lock cover is slidably mounted on the housing along the axial direction, and upper stop ends and lower stop ends corresponding to the triggering ends are respectively disposed at upper and lower ends of the sliding lock cover.

Furthermore, a stop flange is formed on the triggering end side of each of the first handle control piece and the second handle control piece. The sliding lock cover is provided with a first lock position and a second lock position. When the sliding lock cover slides upwards to enter the first lock position, the lower stop end is clamped with the stop flange of the first handle control piece. When the sliding lock cover slides downwards to enter the second lock position, the upper stop end is clamped with the stop flange of the second handle control piece.

In the present technical solution, the first handle control piece and the second handle control piece are elastic strip plastic parts. One end of the strip plastic part is mounted on the housing, such that when the triggering end at the other end is pressed, the plastic part is elastically deformed, and the clamping portion on the inner side of the trigger end can move inward to clamp the traction piece.

Furthermore, a fixed flange is disposed at one end of each of the first handle control piece and the second control piece, and the triggering end and the clamping portion are formed at the end, away from the fixed flange, of each of the first handle control piece and the second handle control piece. The housing is provided with fixed clamping grooves for placing the fixed flanges. A sheath is mounted at the upper end of the guide rail rod body.

Furthermore, concave sliding grooves are formed on two sides of the housing, and the sliding lock cover is correspondingly provided with slider protrusions matched with the concave sliding grooves.

Furthermore, the housing includes an upper cover and a lower cover buckled together, and the sliding lock cover is mounted on the upper cover.

Furthermore, a mounting groove is disposed on the inner side of the upper cover, a fixing piece is slidably mounted in the mounting groove, the fixing piece is fixedly connected to the sliding lock cover, elastic clamping blocks are disposed on two sides of the fixing piece, and the mounting groove is provided with a first positioning clamping groove and a second positioning clamping groove correspondingly clamped with the elastic clamping blocks. When the sliding lock cover is in the first lock position, the elastic clamping blocks are clamped in the first positioning clamping groove. When the sliding lock cover is in the second lock position, the elastic clamping blocks are clamped in the second positioning clamping groove.

Furthermore, a guide piece used for guiding the traction piece is disposed at the lower end of the guide rail rod body.

Furthermore, the traction piece is a pull rope, and a guide roller is mounted in the guide piece. Wire holes through which the pull rope passes are correspondingly formed in the housing along the axial direction, and a wire clamping cavity is formed on one side of each wire hole. When the triggering end is pressed, the pull rope is fixed in the corresponding wire clamping cavity by the clamping portion.

Furthermore, a first wire clamping protrusion is disposed in each wire clamping cavity. Each clamping portion is provided with a wire clamping block, and a second wire clamping protrusion is disposed on one side of each wire clamping block. Guide blocks are formed in the housing, the guide blocks are placed in the accommodating cavities, and the wire holes and the wire clamping cavities are disposed on the guide blocks.

Furthermore, a guide rail guide groove is formed on one side of each guide block, a guide rail flange is formed at an opening of each accommodating cavity, and the guide rail flange and the guide rail guide groove are slidably matched with each other.

Furthermore, the traction piece may also be a pull bead chain, and an arc-shaped groove through which the pull bead chain passes is disposed in the guide piece.

Furthermore, each clamping portion is provided with at least one wire clamping groove. Guide sliding grooves are formed on two sides of the housing, and the clamping portions are movably mounted in the guide sliding grooves.

Furthermore, the upper cover is provided with clamping grooves, the lower cover is provided with clamping protrusions corresponding to the clamping grooves, and a receding groove is disposed at the bottom of the mounting groove in a cut-through manner.

The present technical solution further provides a use method of a child-resistant roller blind lifting fixing rod, realized based on the child-resistant roller blind lifting fixing rod. When the roller blind head is adjusted clockwise, the use method includes the following steps:

step S101: sliding the sliding lock cover of the lifting handle upwards to enter the first lock position, and the lower stop end of the sliding lock cover being clamped with the stop flange of the first handle control piece such that the first handle control piece cannot be triggered by an external force;

step S102: sliding the lifting handle upwards to a position close to the upper end of the guide rail rod body;

step S103: continuously pressing the triggering end on the second handle control piece of the lifting handle, and clamping the traction piece in the corresponding accommodating cavity of the guide rail rod body by the clamping portion of the second handle control piece;

step S104: pulling down the whole lifting handle to pull the traction piece on the second handle control piece side to move downwards, thus achieving clockwise adjustment of the roller blind head; and step S105: after adjusting in place, releasing the lifting handle, and the lifting handle falling to the lower end of the guide rail rod body under the effect of gravity.

When the roller blind head is adjusted counterclockwise, the use method includes the following steps:

step S201: sliding the sliding lock cover downwards to enter the second lock position, and the upper stop end of the sliding lock cover being clamped with the stop flange of the second handle control piece such that the second handle control piece cannot be triggered by an external force;

step S202: sliding the lifting handle upwards to a position close to the upper end of the guide rail rod body;

step S203: continuously pressing the triggering end on the first handle control piece, and clamping the traction piece in the corresponding accommodating cavity of the guide rail rod body by the clamping portion of the first handle control piece;

step S204: pulling down the whole lifting handle to pull the traction piece on the first handle control piece side to move downwards, thus achieving counterclockwise adjustment of the roller blind head; and step S205: after adjusting in place, releasing the lifting handle, and the lifting handle falling to the lower end of the guide rail rod body under the effect of gravity.

(III) Beneficial Effects

The present invention has the following advantages:

1): the pull rope or the pull bead chain is wholly hidden in the accommodating cavities on two sides of the guide rail rod body, which can prevent from being pulled by children; and the overall operation is safe and reliable, and the whole fixing rod is novel and elegant in structure;

2): the lifting handle is slidably disposed on the guide rail rod body, and by pressing the triggering end of the first handle control piece or the second handle control piece, the pull rope or the pull bead chain on the corresponding side is clamped by the clamping portion; and by further pulling down the whole lifting handle to drive the pull rope or the pull bead chain on the corresponding side to move downwards, the roller blind head is driven to rotate clockwise or counterclockwise, so that up or down movement of the roller blind is achieved;

3): the housing is provided with the slidably sliding lock cover, the sliding lock cover being provided with a first lock position and a second lock position; when the sliding lock cover is in the first lock position, the triggering end of the first handle control piece is blocked by the lower stop end of the sliding lock cover, and meanwhile, the second handle control piece is in a workable state; when the sliding lock cover is in the second lock position, the triggering end of the second handle control piece is blocked by the upper stop end of the sliding lock cover, and meanwhile, the first handle control piece is in the workable state; and switching between the first lock position and the second lock position is achieved by the sliding lock cover; and 4): the fixing piece is slidably mounted in the upper cover, and connected to the sliding lock cover; the elastic clamping blocks on two sides of the fixing piece are correspondingly clamped with the first positioning clamping groove and the second positioning clamping groove in the upper cover, and the sliding lock cover can only be pushed by overcoming the elastic force of the elastic blocks, so that the sliding lock cover has a certain self-locking property.

Figure 1:
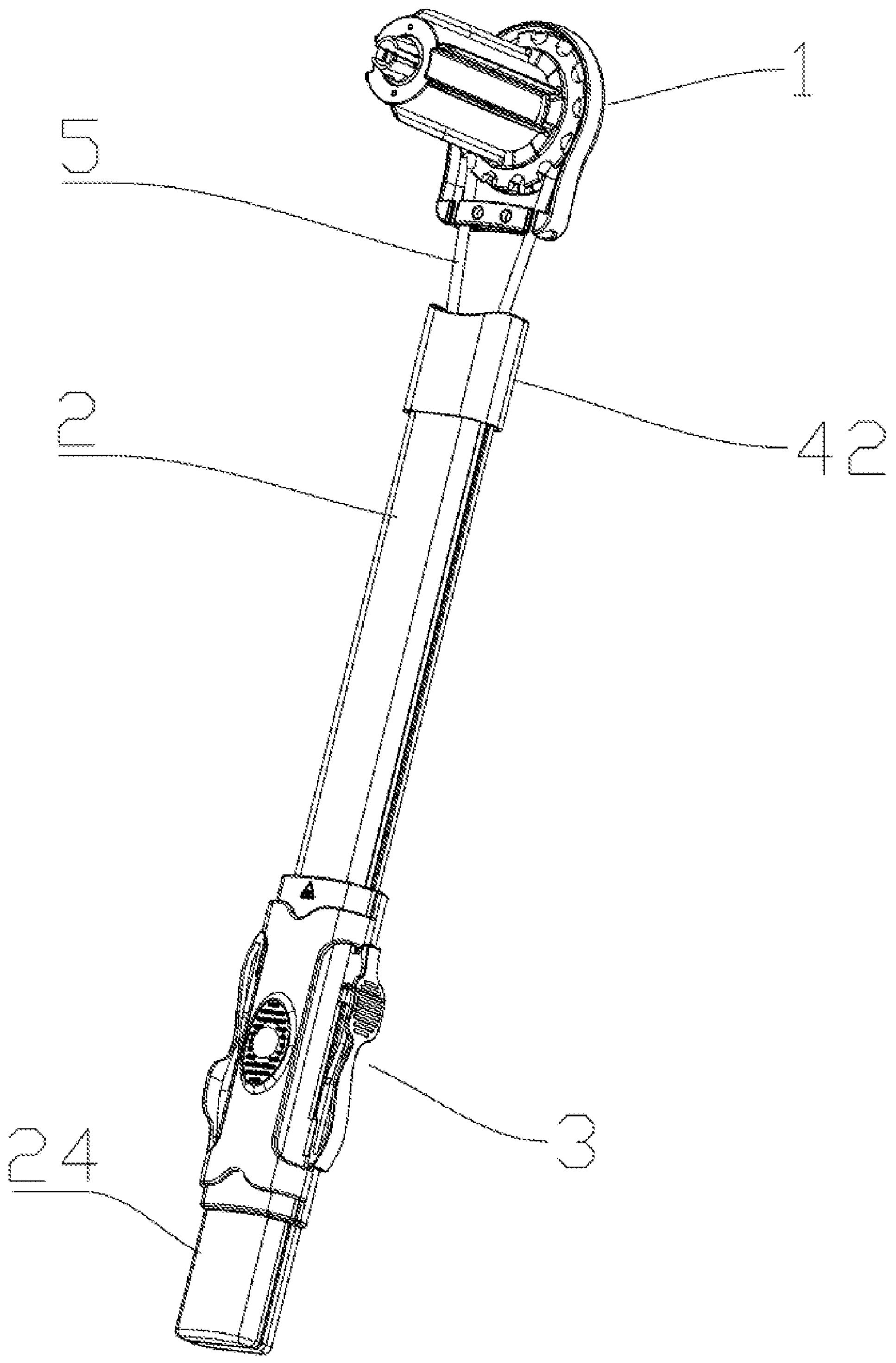
FIG. 1 is a stereogram of Embodiment 1 of the present invention.

In the drawings: 1 denotes roller blind head; 2 denotes guide rail rod body; 3 denotes lifting handle; 4 denotes accommodating cavity; 5 denotes traction piece; 6 denotes housing; 7 denotes first handle control piece; 8 denotes second handle control piece; 9 denotes triggering end; 10 denotes clamping portion; 11 denotes sliding lock cover; 12 denotes upper stop end; 13 denotes lower stop end; 14 denotes stop flange; 15 denotes concave sliding groove; 16 denotes slider protrusion; 17 denotes upper cover; 18 denotes lower cover; 19 denotes mounting groove; 20 denotes fixing piece; 21 denotes elastic clamping block; 22 denotes first positioning clamping groove; 23 denotes second positioning clamping groove; 24 denotes guide piece; 25 denotes guide roller; 26 denotes arc-shaped groove; 27 denotes wire hole; 28 denotes wire clamping cavity; 29 denotes first wire clamping protrusion; 30 denotes wire clamping block; 31 denotes second wire clamping protrusion; 32 denotes guide block; 33 denotes wire clamping groove; 34 denotes guide sliding groove; 35 denotes fixed flange; 36 denotes fixed clamping groove; 37 denotes clamping groove; 38 denotes clamping protrusion; 39 denotes receding groove; 40 denotes guide rail guide groove; 41 denotes guide rail flange; 42 denotes sheath; 43 denotes guide piece upper cover; 44 denotes guide piece lower cover; 45 denotes protrusion portion; 46 denotes placing groove; and 47 denotes antiskid protrusion.

DETAILED DESCRIPTION OF THE INVENTION

Embodiment 1

Referring to FIG. 1-FIG. 12, the present invention provides a child-resistant roller blind lifting fixing rod, used for connecting an external roller blind head 1. The child-resistant roller blind lifting fixing rod includes a guide rail rod body 2 and a lifting handle 3, wherein accommodating cavities 4 are disposed on two sides of the guide rail rod body 2 along an axial direction in a cut-through manner, a traction piece 5 of the roller blind head 1 is correspondingly placed in the accommodating cavities 4, the lifting handle 3 includes a housing 6 slidably sleeved on the guide rail rod body 2 along the axial direction and a first handle control piece 7 and a second handle control piece 8 correspondingly mounted on two sides of the housing 6, and each of the first handle control piece 7 and the second handle control piece 8 is provided with a triggering end 9 and a clamping portion 10 corresponding to the traction piece 5.

Figure 6:
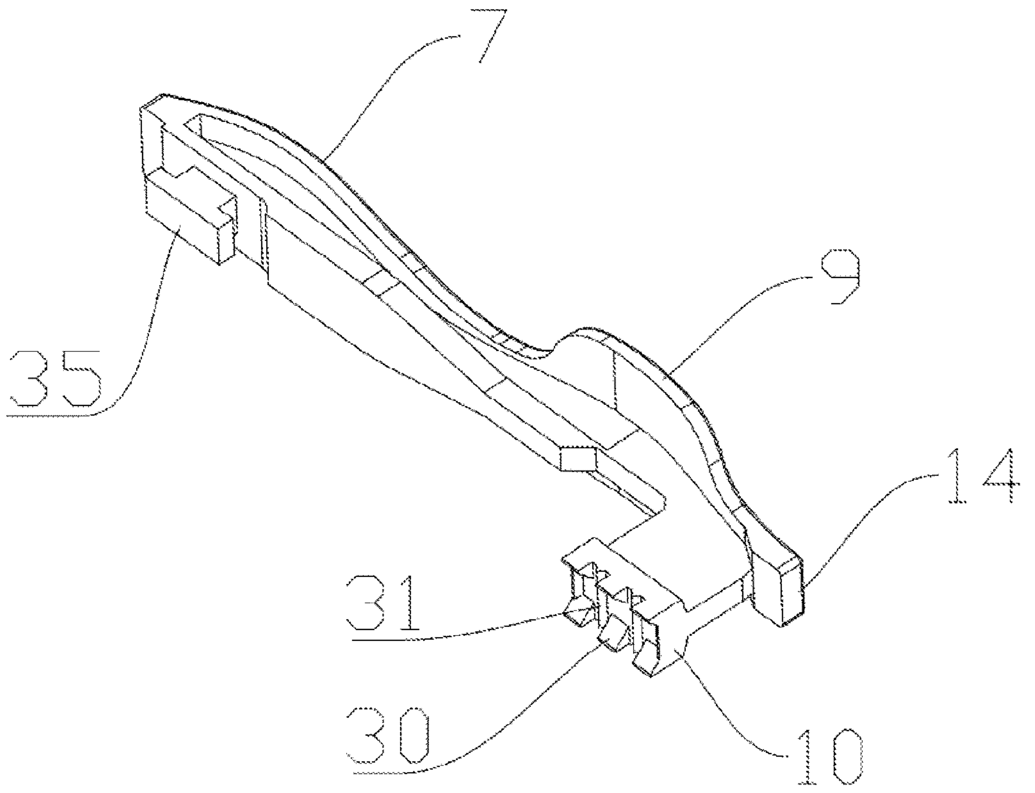
FIG. 6 is a stereogram of a first handle control piece of Embodiment 1 of the present invention.

Referring to FIG. 6, the clamping portion 10 is disposed on the inner side of the triggering end 9. The axial length of the guide rail rod body 2 can be set according to actual use requirements.

When in use, by triggering the triggering end 9 of the first handle control piece 7 or the second hand control piece 8, the clamping portion 10 clamps the traction piece 5, and by pulling down the whole lifting handle 3 (the triggering end 9 is always in a triggered state at the moment, that is, the clamping portion 9 always clamps the traction piece 5), the traction piece 5 on the corresponding triggering end 9 side is driven to move downwards, so that counterclockwise or clockwise rotation of the roller blind head 1 is achieved. In the present embodiment, clamping of the clamping portion 10 and the traction piece 5 is achieved by continuously pressing the triggering end 9, that is, the clamping of the clamping portion 10 and the traction piece 5 can also be achieved by means of moving the triggering end 9 or sliding the triggering end 9 or the like.

Figure 12:
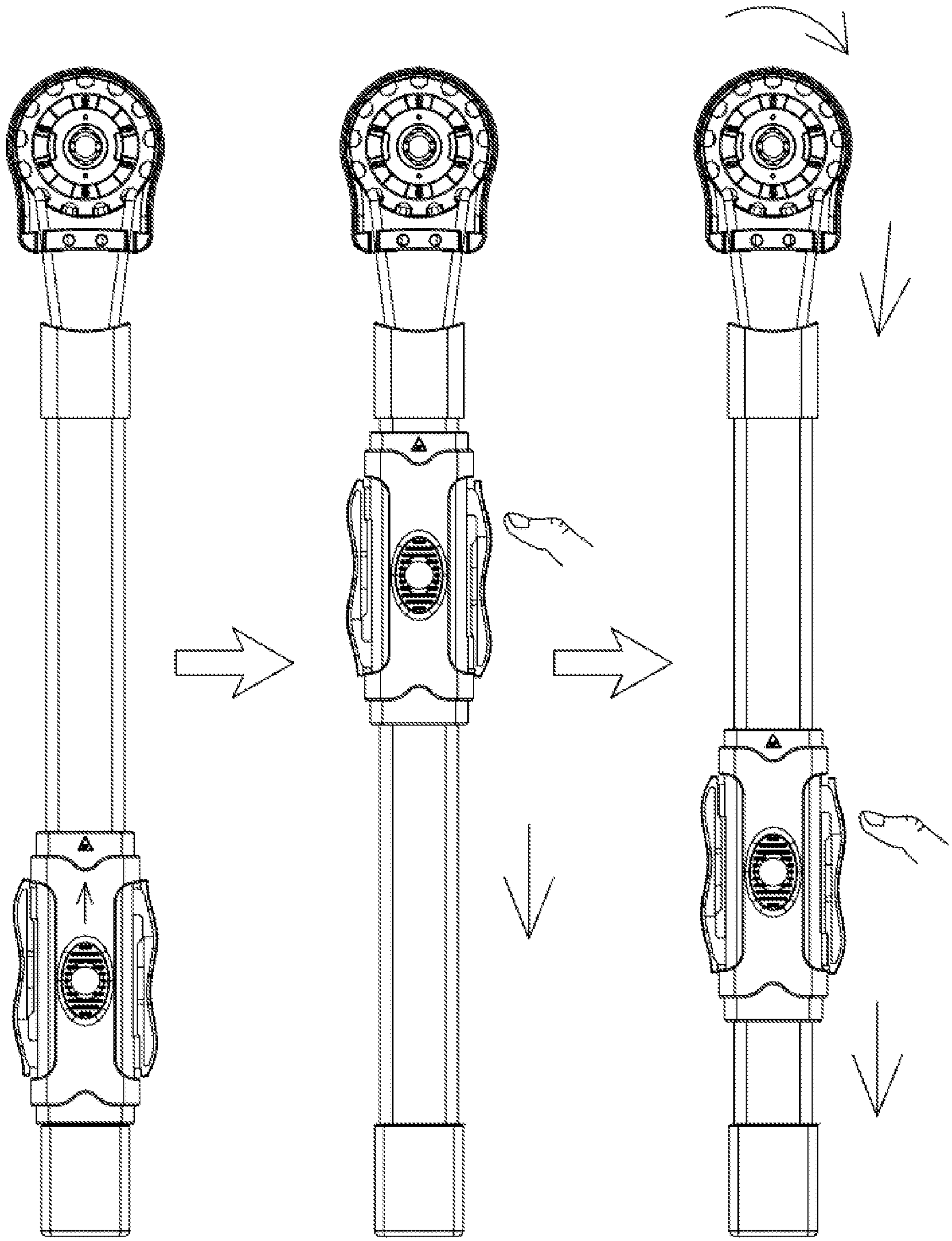
FIG. 12 is an operation schematic diagram of Embodiment 1 of the present invention.
Figure 13:
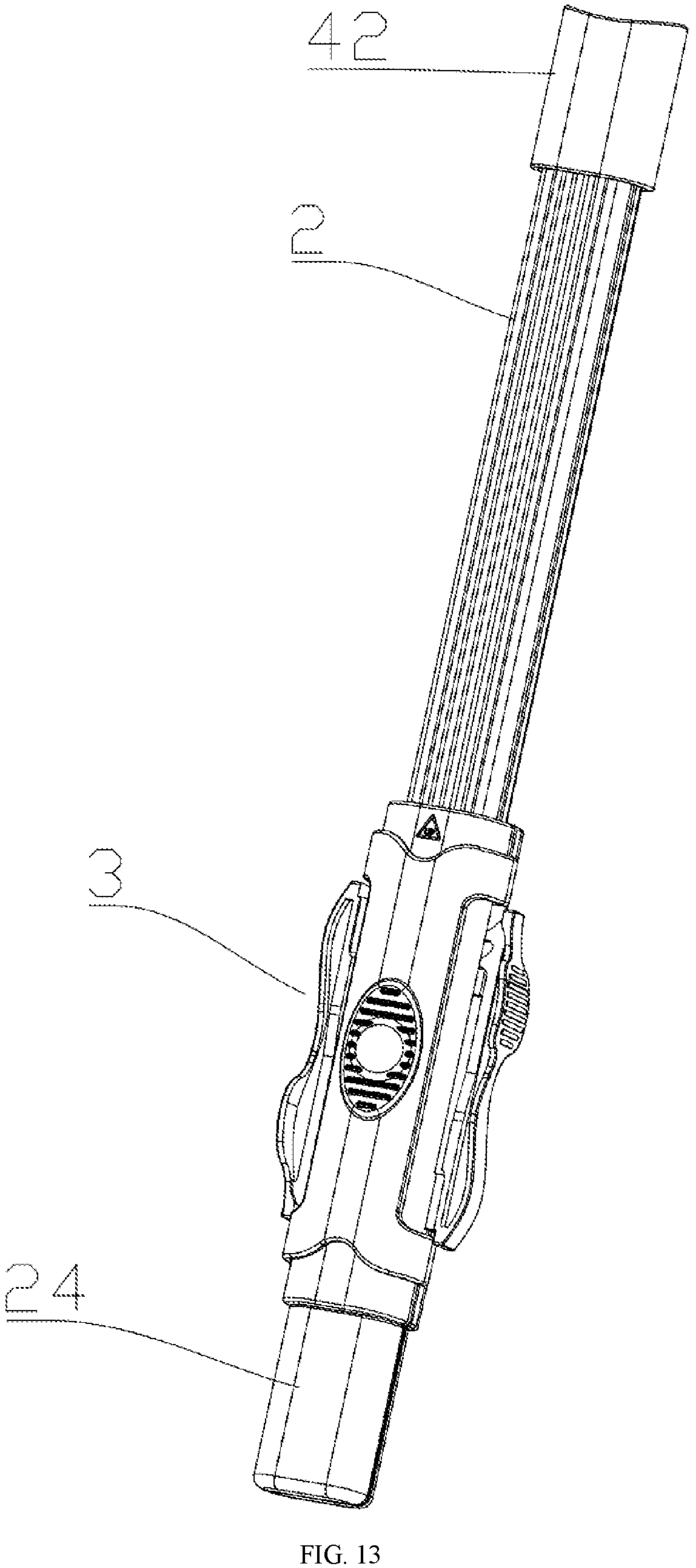
FIG. 13 is a stereogram of Embodiment 2 of the present invention.

In conjunction with FIG. 12, in the present embodiment, by pressing the triggering end 9 of the second handle control piece 8 and pulling down the whole lifting handle 3, clockwise rotation of the traction piece 5 is achieved.

Referring to FIG. 1, a guide piece 24 used for guiding the traction piece 5 is disposed at the lower end of the guide rail rod body 2. In a normal state, the lifting handle 3 falls to the bottom end of the guide rail rod body 2 under the effect of gravity, and the guide rail rod body 2 is always in a vertical state in the normal state. In the present embodiment, in the normal state, the lifting handle 3 is positioned above the guide piece 24. The whole traction piece 5 takes the shape of a closed ring, with the upper end wound around the roller blind head 1 and the lower end wound around the guide piece 24. By pulling down the traction piece 5 on the first handle control piece 7 side, and pulling down the second handle control piece 8, counterclockwise or clockwise rotation of the roller blind head 1 is achieved.

In the present embodiment, the traction piece 5 is hidden in the guide rail rod body 2, and combined with the first handle control piece 7 and the second handle control piece 8 to clamp the traction piece 5 to move downwards by the triggering end 9 and the clamping portion 10, and the downward movement of the traction piece 5 drives the roller blind head 1 to rotate. The whole device is safe and reliable in use, avoids potential safety hazards caused by exposing of the traction piece 5, and can prevent the occurrence of winding of children.

Figure 4:
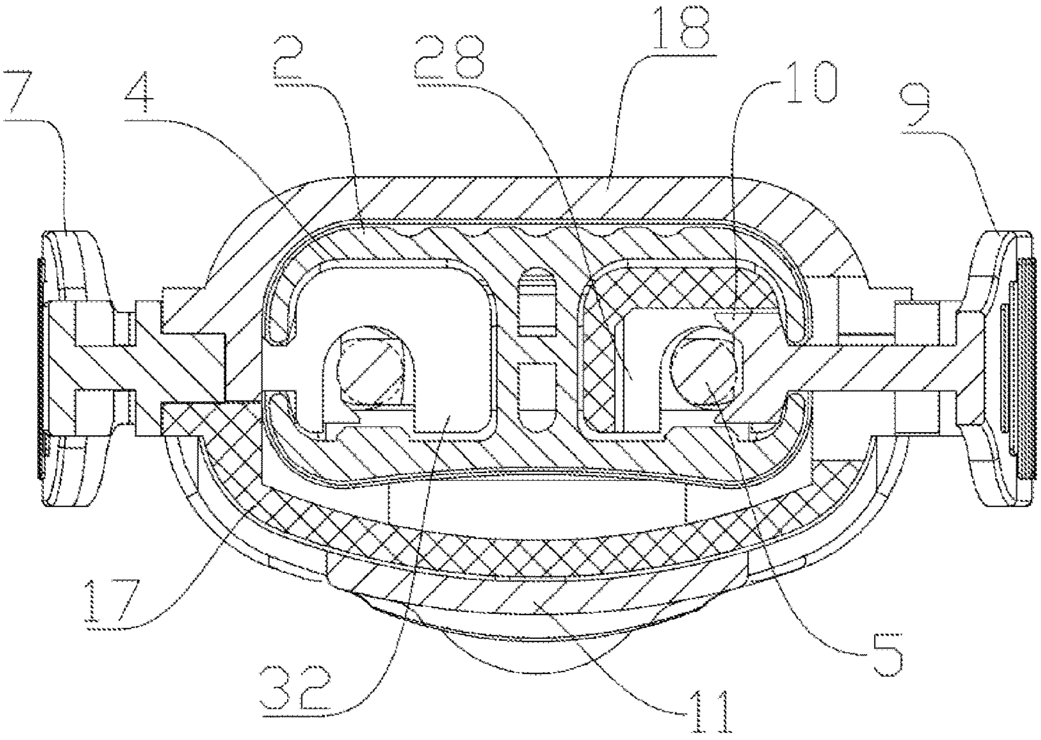
FIG. 4 is a sectional view of Embodiment 1 of the present invention.
Figure 11:
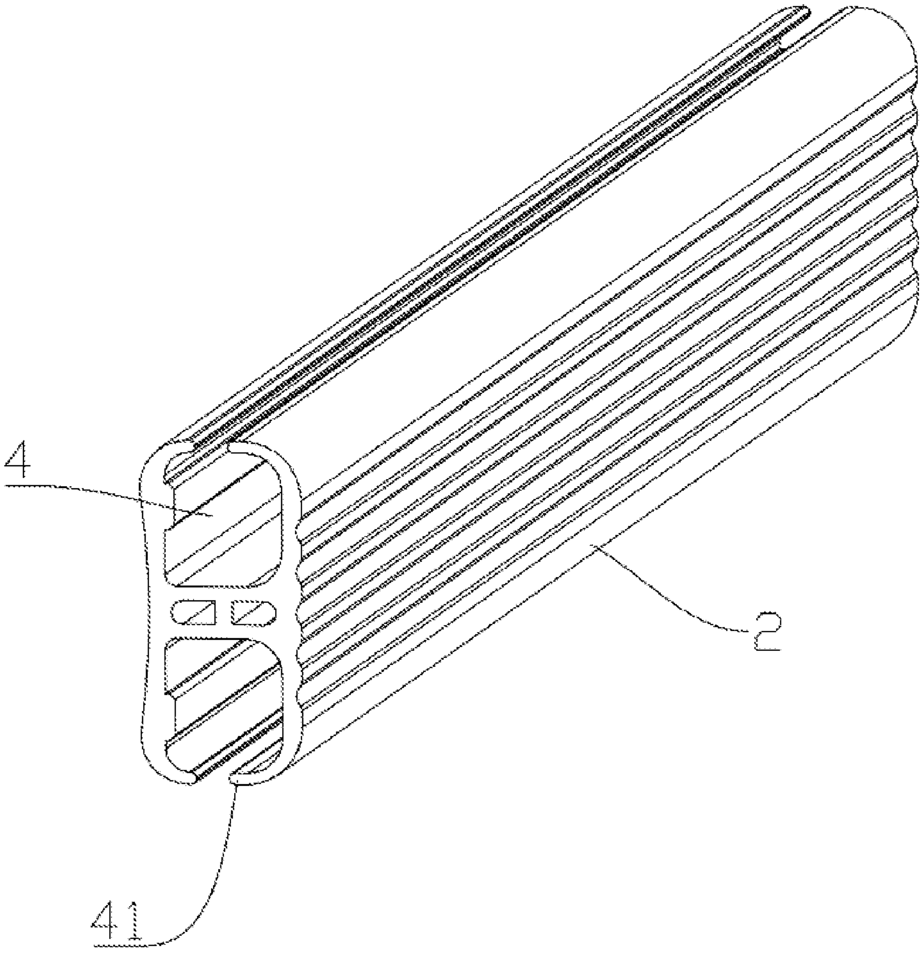
FIG. 11 is a stereogram of a guide rail rod body of Embodiment 1 of the present invention.

Referring to FIG. 4 and FIG. 11, the clamping portions 10 are placed in the accommodating cavities 4.

Figure 3:
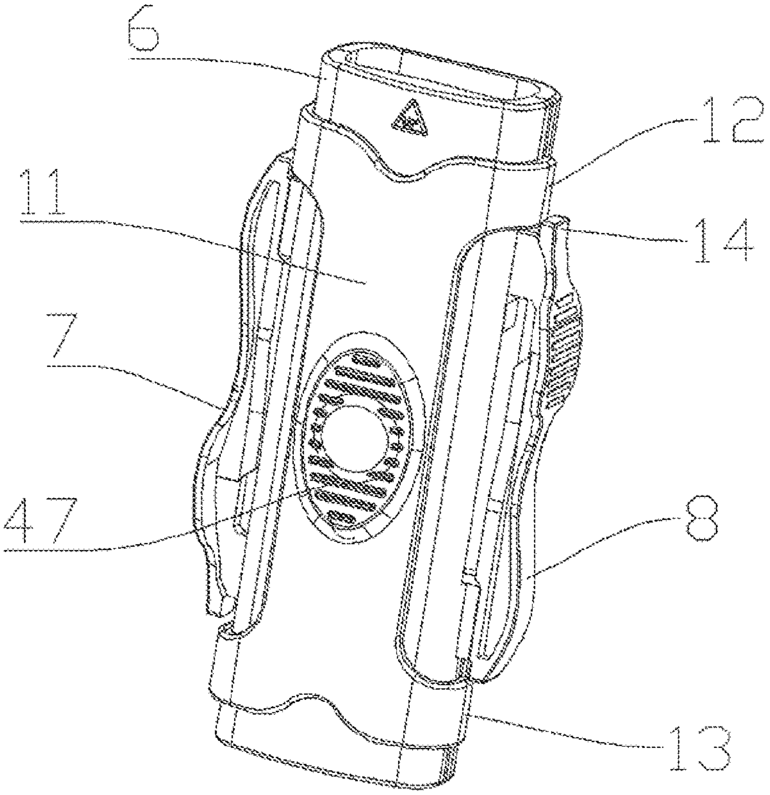
FIG. 3 is a stereogram of a lifting handle of Embodiment 1 of the present invention.
Figure 10:
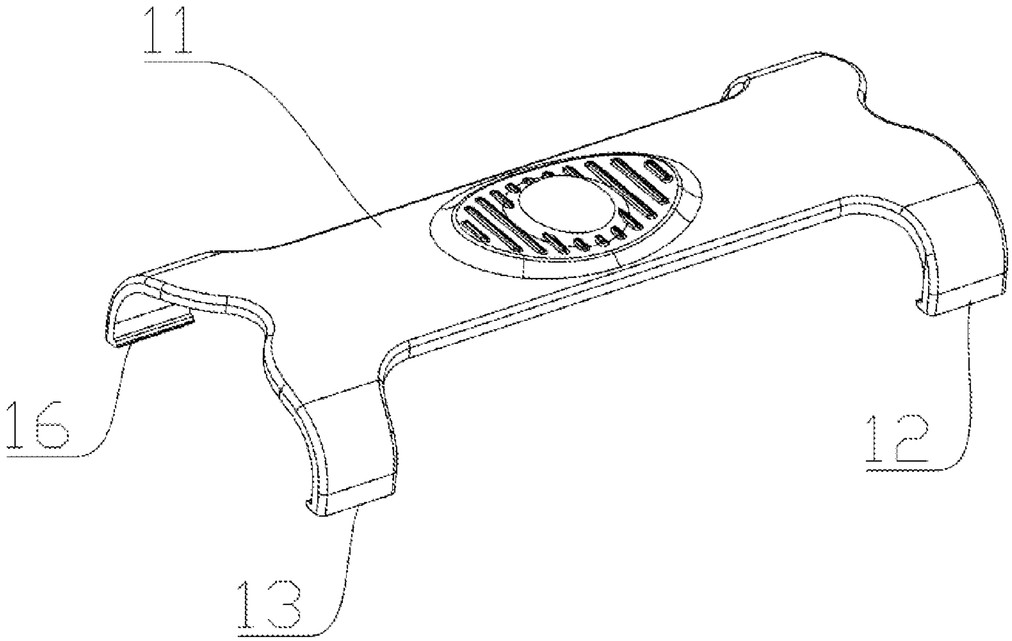
FIG. 10 is a stereogram of a sliding lock cover of Embodiment 1 of the present invention.

Referring to FIG. 3 and FIG. 10, a sliding lock cover 11 is slidably mounted on the housing 6 along an axial direction, and upper stop ends 12 and lower stop ends 13 corresponding to the triggering ends 9 are respectively disposed at upper and lower ends of the sliding lock cover 11. A stop flange 14 is formed on the triggering end 9 side of each of the first handle control piece 7 and the second handle control piece 8.

The sliding lock cover 11 is provided with a first lock position and a second lock position. When the sliding lock cover 11 slides upwards to enter the first lock position, the lower stop end 13 is clamped with the stop flange 14 of the first handle control piece 7. When the sliding lock cover 11 slides downwards to enter the second lock position, the upper stop end 12 is clamped with the stop flange 14 of the second handle control piece 8. FIG. 3 is a stereogram of the sliding lock cover 11 in the second lock position. At the moment, the triggering end 9 of the second handle control piece 8 is in a locked state, and only the first handle control piece 7 can be pressed. Referring to FIG. 3, in the present embodiment, the triggering end 9 of the first handle control piece 7 is positioned at the lower left position of the lifting handle 3, and the triggering end 9 of the second handle control piece 8 is positioned at the upper right position of the lifting handle 3.

In the present embodiment, the first handle control piece 7 and the second handle control piece 8 have the same structure, which are both elastic strip plastic parts. One end of the strip plastic part is mounted on the housing 6, such that when the triggering end 9 at the other end is pressed, the strip plastic part is elastically deformed, and the clamping portion 10 on the inner side of the trigger end 9 can move inward to clamp the traction piece 5, the pressing triggering direction being toward the accommodating cavity 4 of the guide rail rod body 2. After a force applied to the triggering end 9 is removed, the corresponding handle control piece is reset. Specifically referring to FIG. 6, a fixed flange 35 is disposed at one end of each of the first handle control piece 7 and the second control piece 8, and the triggering end 9 and the clamping portion 10 are formed at the end, away from the fixed flange 35, of each of the first handle control piece 7 and the second handle control piece 8. The housing 6 is provided with fixed clamping grooves 36 for placing the fixed flanges 35. A sheath 42 is mounted at the upper end of the guide rail rod body 2.

Figure 7:
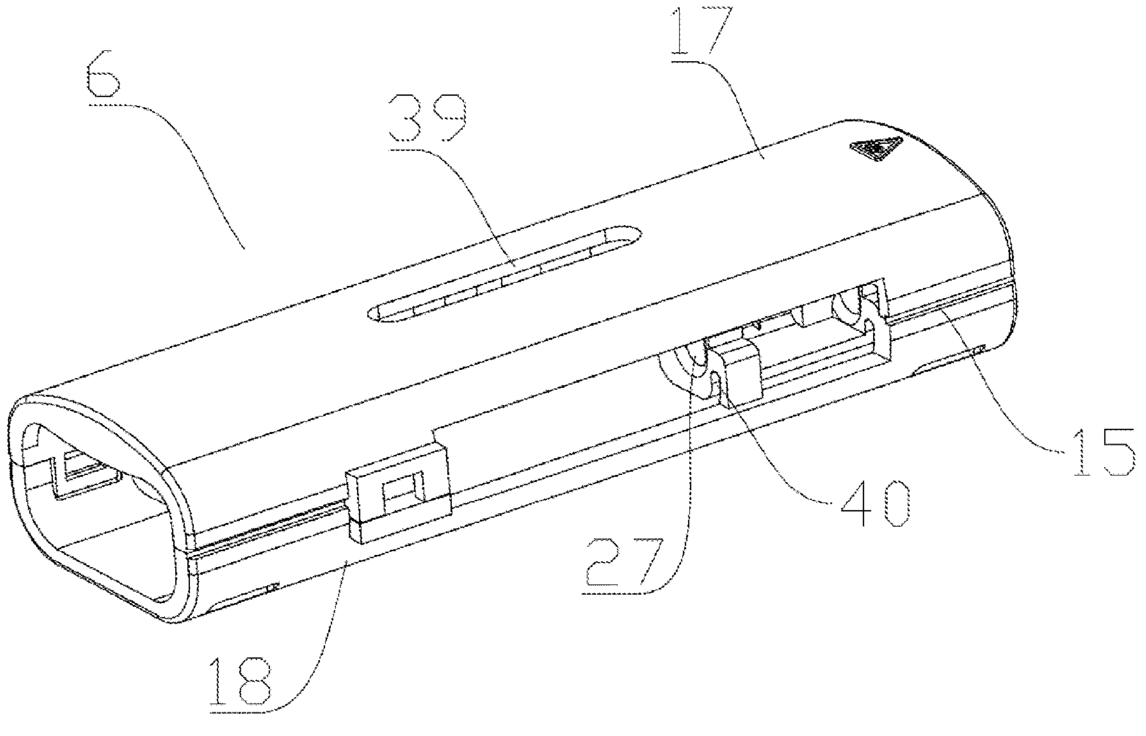
FIG. 7 is a stereogram of a housing of Embodiment 1 of the present invention.

Referring to FIG. 7, concave sliding grooves 15 are formed on two sides of the housing 6, and the sliding lock cover 11 is correspondingly provided with slider protrusions 16 matched with the concave sliding grooves 15.

Referring to FIG. 2 and FIG. 7-FIG. 9, the housing 6 includes an upper cover 17 and a lower cover 18 buckled together, and the sliding lock cover 11 is mounted on the upper cover 17. A mounting groove 19 is disposed on the inner side of the upper cover 17, a fixing piece 20 is slidably mounted in the mounting groove 19, the fixing piece 20 is fixedly connected to the sliding lock cover 11, and in the present embodiment, the fixing piece 20 is fixedly connected to the sliding lock cover 11 by a fixing bolt. Elastic clamping blocks 21 are disposed on two sides of the fixing piece 20, and the mounting groove 19 is provided with a first positioning clamping groove 22 and a second positioning clamping groove 23 correspondingly clamped with the elastic clamping blocks 21. When the sliding lock cover 11 is in the first lock position, the elastic clamping blocks 21 are clamped in the first positioning clamping groove 22. When the sliding lock cover 11 is in the second lock position, the elastic clamping blocks 21 are clamped in the second positioning clamping groove 23. In the present embodiment, the elastic clamping blocks 21 and two corresponding positioning clamping grooves are provided, so that a certain thrust is required to axially push the sliding lock cover 11 to slide in the mounting groove 19, thereby avoiding change of the positions of the first lock position and the second lock position when the sliding lock cover 11 is accidentally touched.

Referring to FIG. 3, an antiskid protrusion 47 is disposed on the sliding lock cover 11, and by pushing the antiskid protrusion 47, up or down axial movement of the sliding lock cover 11 is achieved.

Figure 2:
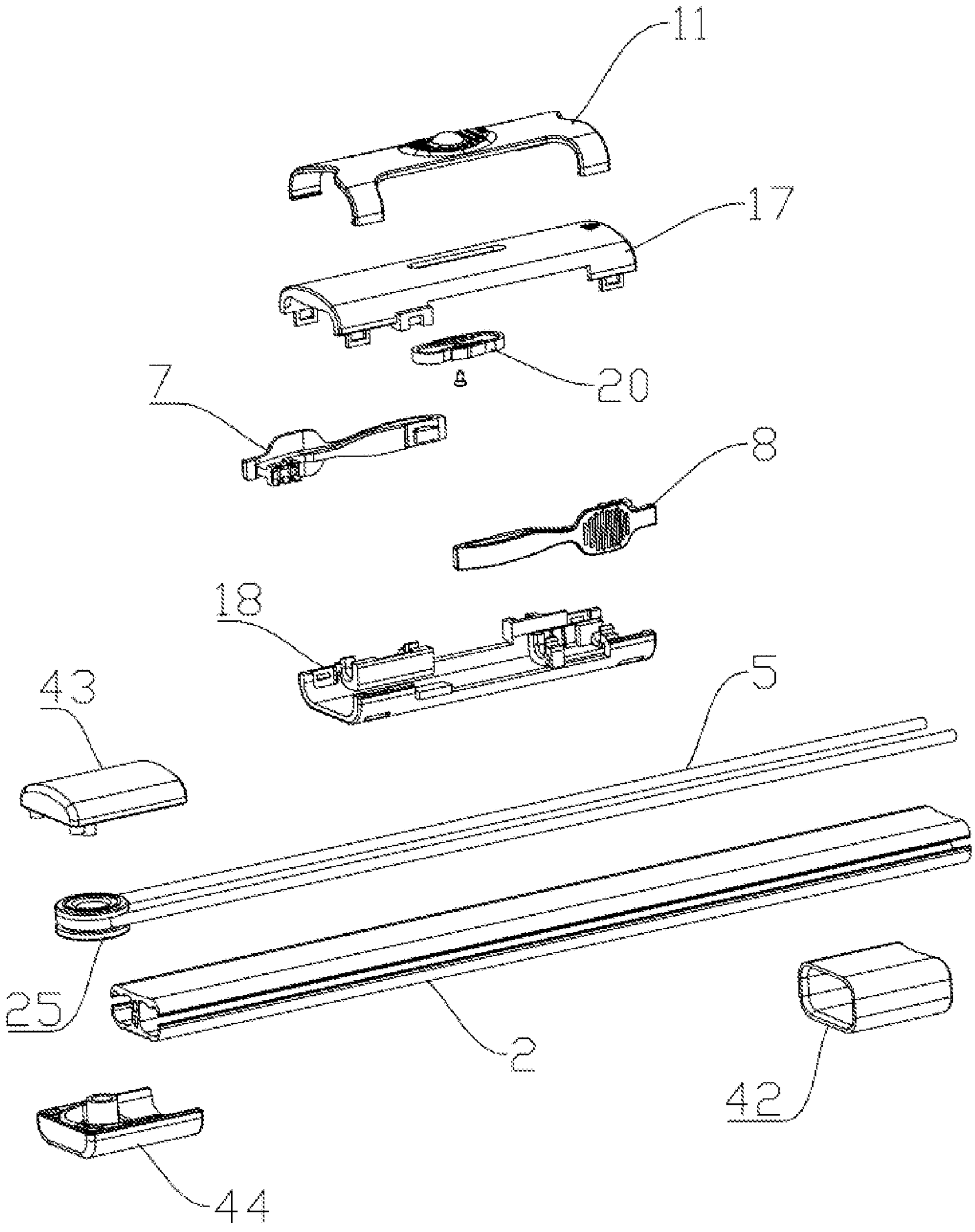
FIG. 2 is an explosive view of Embodiment 1 of the present invention.
Figure 5:
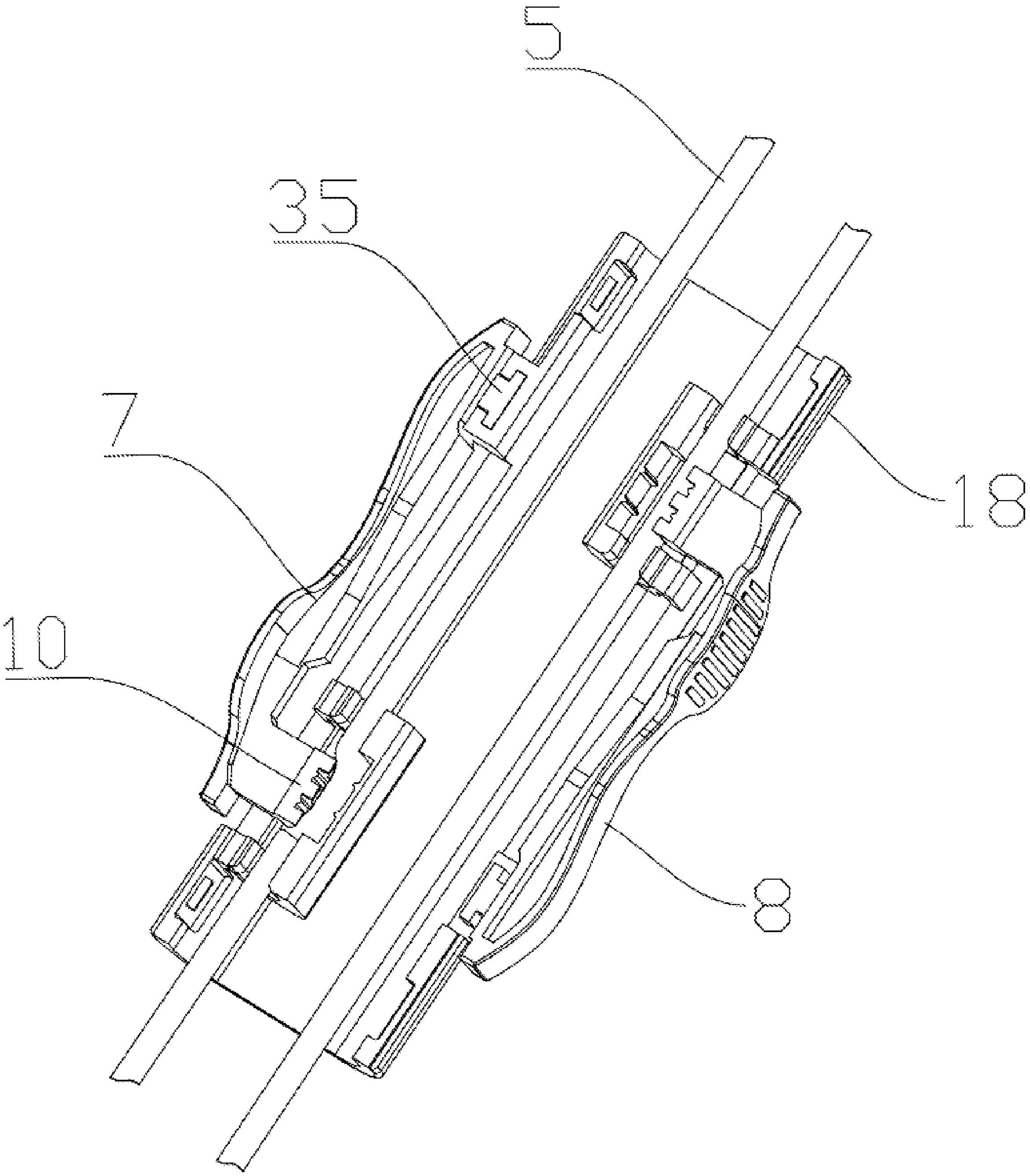
FIG. 5 is a stereogram of a clamping portion clamping a traction piece of Embodiment 1 of the present invention.

Referring to FIG. 1, FIG. 4 and FIG. 5, in the present embodiment, the traction piece 5 is a pull rope, and a guide roller 25 is mounted in the guide piece 24. The whole pull rope takes the shape of a closed ring, with one end wound around the roller blind head 1 and the other end wound around the guide roller 25 in the guide piece 24. Referring to FIG. 2, the guide piece 24 includes a guide piece upper cover 43 and a guide piece lower cover 44. Wire holes 27 through which the pull rope passes are correspondingly formed in the housing 6 along the axial direction, and a wire clamping cavity 28 is formed on one side of each wire hole 27. When in use, the triggering end 9 is pressed, the pull rope is fixed in the wire clamping cavity 28 by the clamping portion 10, and after the triggering end 9 is released, the clamping portion 10 is reset and out of contact with the pull rope.

Figure 9:
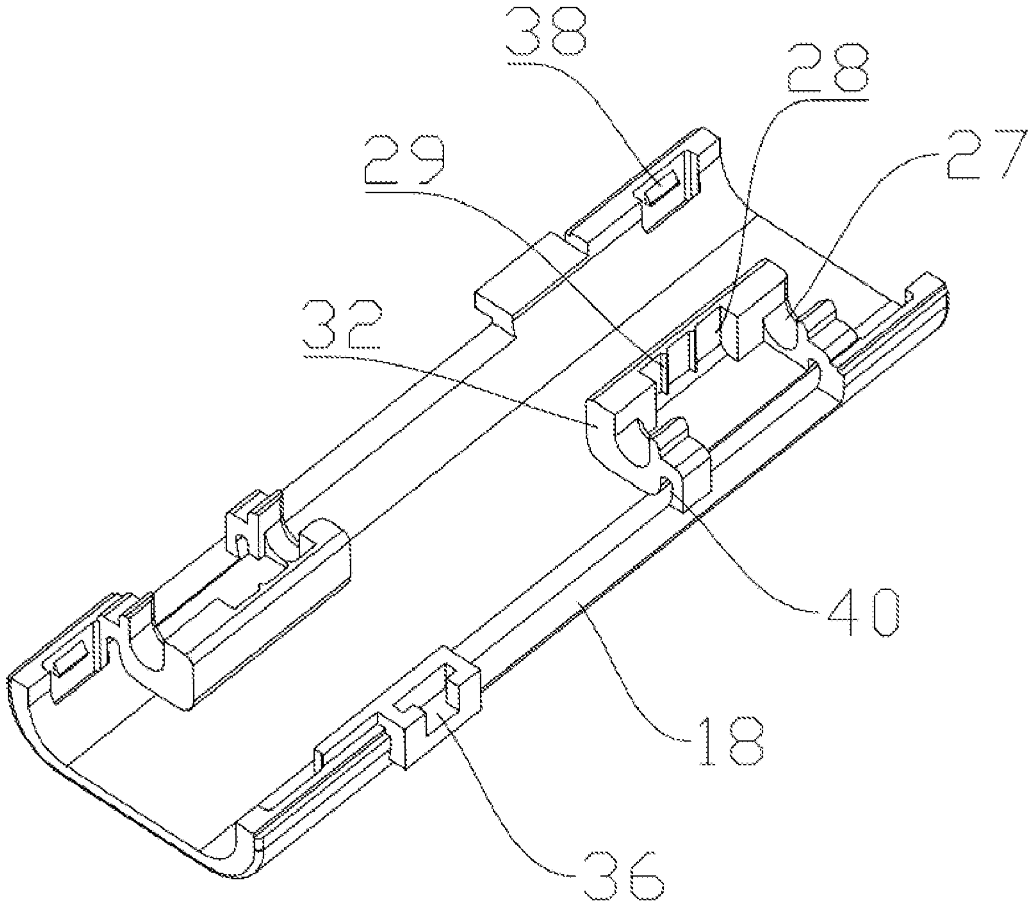
FIG. 9 is a stereogram of a lower cover of Embodiment 1 of the present invention.

Referring to FIG. 5, FIG. 6 and FIG. 9, by pressing the triggering end 9 of the first handle control piece 7, the corresponding clamping portion 10 is pressed down to clamp the pull rope into the wire clamping cavity 28, and meanwhile, the whole lifting handle 3 can be pulled down to drive the pull rope on the first handle control piece 7 side to move downwards, so that the roller blind head 1 rotates.

Referring to FIG. 6 and FIG. 9, a first wire clamping protrusion 29 is disposed in each wire clamping cavity 28, a wire clamping block 30 is disposed at each clamping portion 10, and a second wire clamping protrusion 31 is disposed on one side of each wire clamping block 30. Referring to FIG. 4 and FIG. 9, guide blocks 32 are formed in the housing 6, the guide blocks 32 are placed in the accommodating cavities 4 and the guide blocks 32 can slide in the accommodating cavities 4. The wire holes 27 and the wire clamping cavities 28 are disposed on the guide blocks 32.

Referring to FIG. 4, FIG. 7, FIG. 9 and FIG. 11, the guide blocks 32 are suspended on the lower cover 18, and form guide rail guide grooves 40 with side walls of the lower cover 18. Openings are disposed close to the outer ends of the accommodating cavities 4, guide rail flanges 41 are formed at the openings, and the guide rail flange 41 and the guide rail guide groove 40 are slidably matched with each other.

Figure 8:
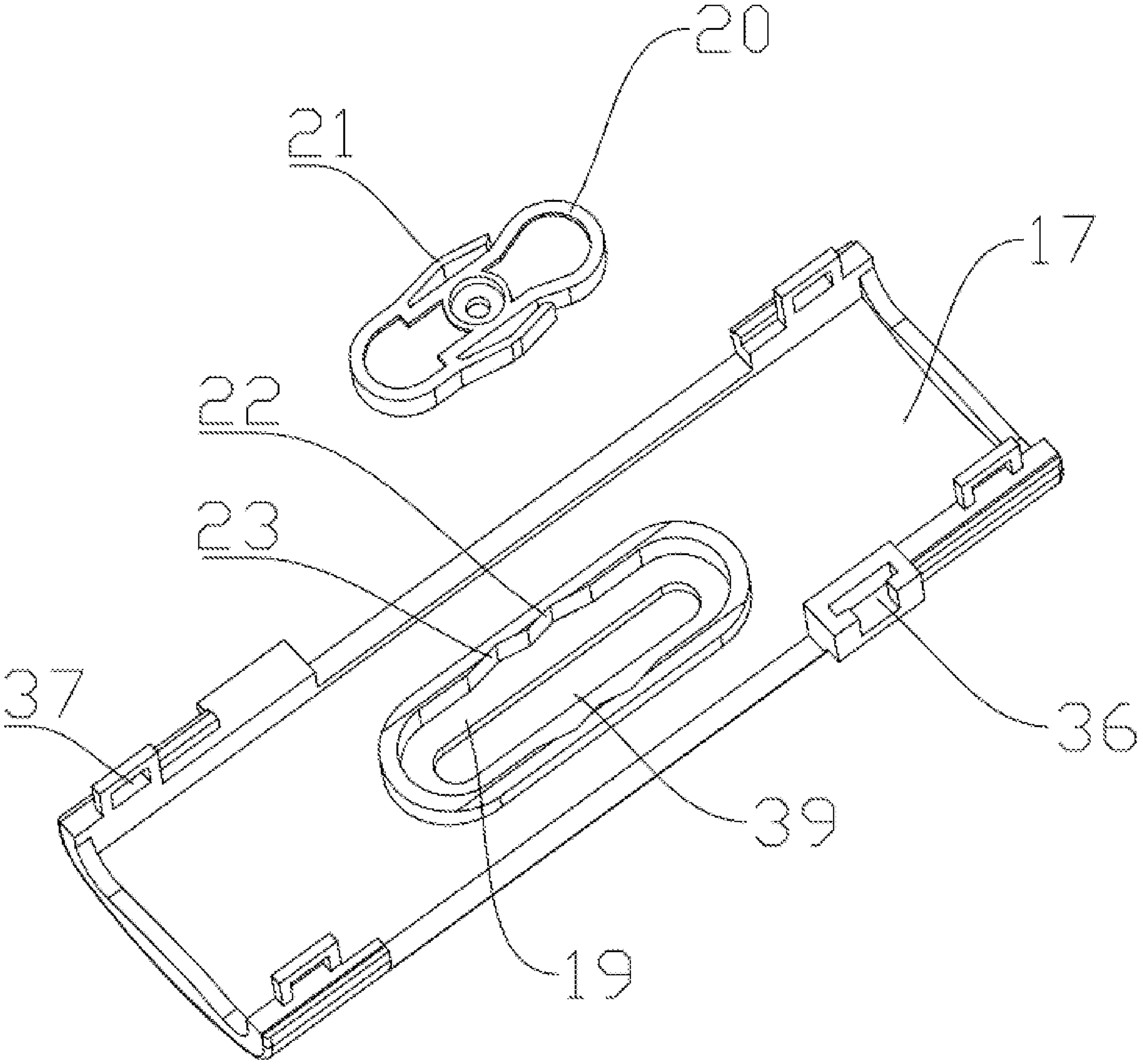
FIG. 8 is a stereogram of an upper cover and a fixing piece of Embodiment 1 of the present invention.

Referring to FIG. 7-FIG. 9, the upper cover 17 is provided with clamping grooves 37, the lower cover 18 is provided with clamping protrusions 38 corresponding to the clamping grooves 37, and a receding groove 39 is disposed at the bottom of the mounting groove 19 in a cut-through manner, the receding groove 39 being used for accommodating the fixing bolt for connecting the fixing piece 20 and the sliding lock cover 11.

Embodiment 2

Figure 14:
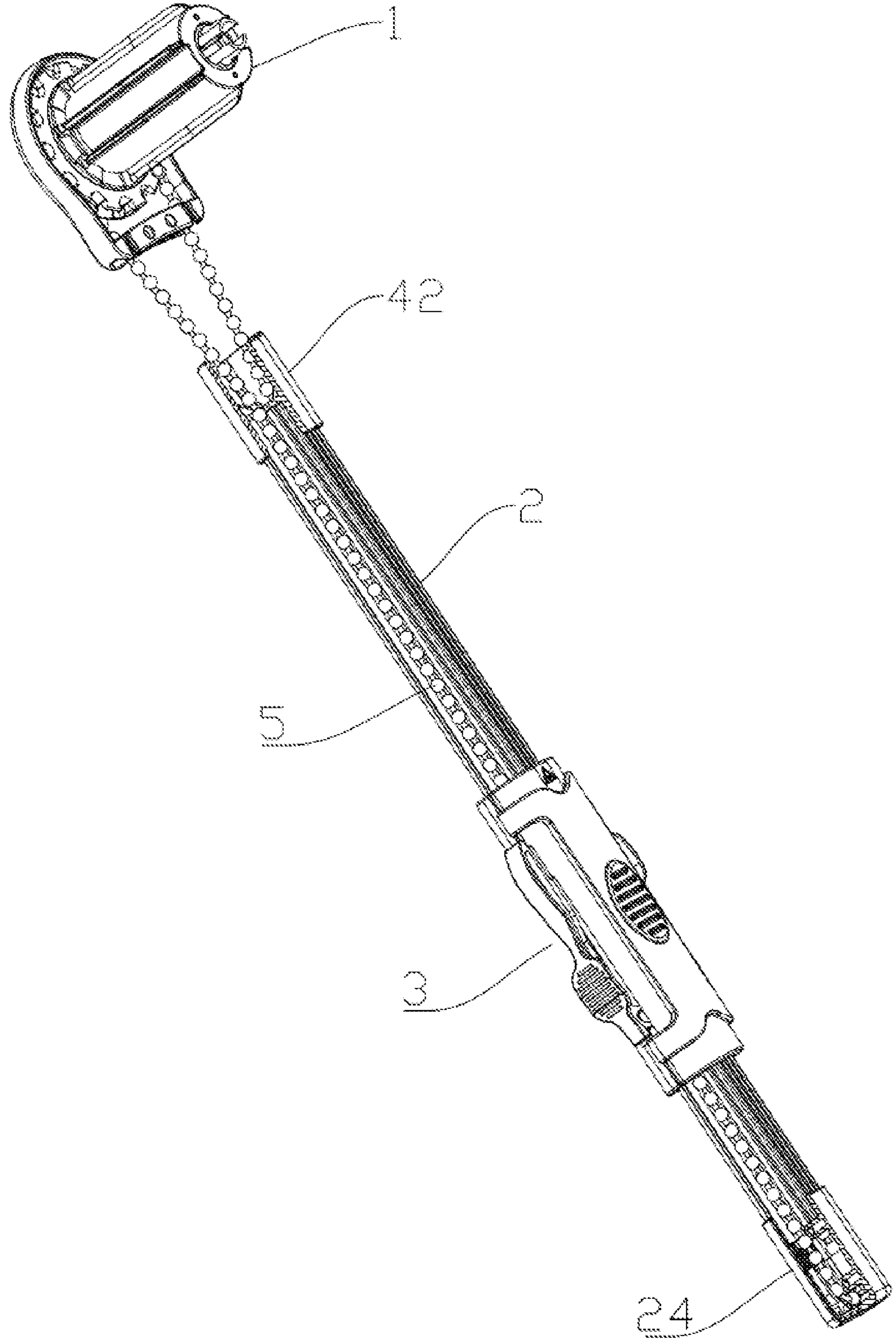
FIG. 14 is a half-sectional stereogram of part of Embodiment 2 of the present invention.
Figure 15:
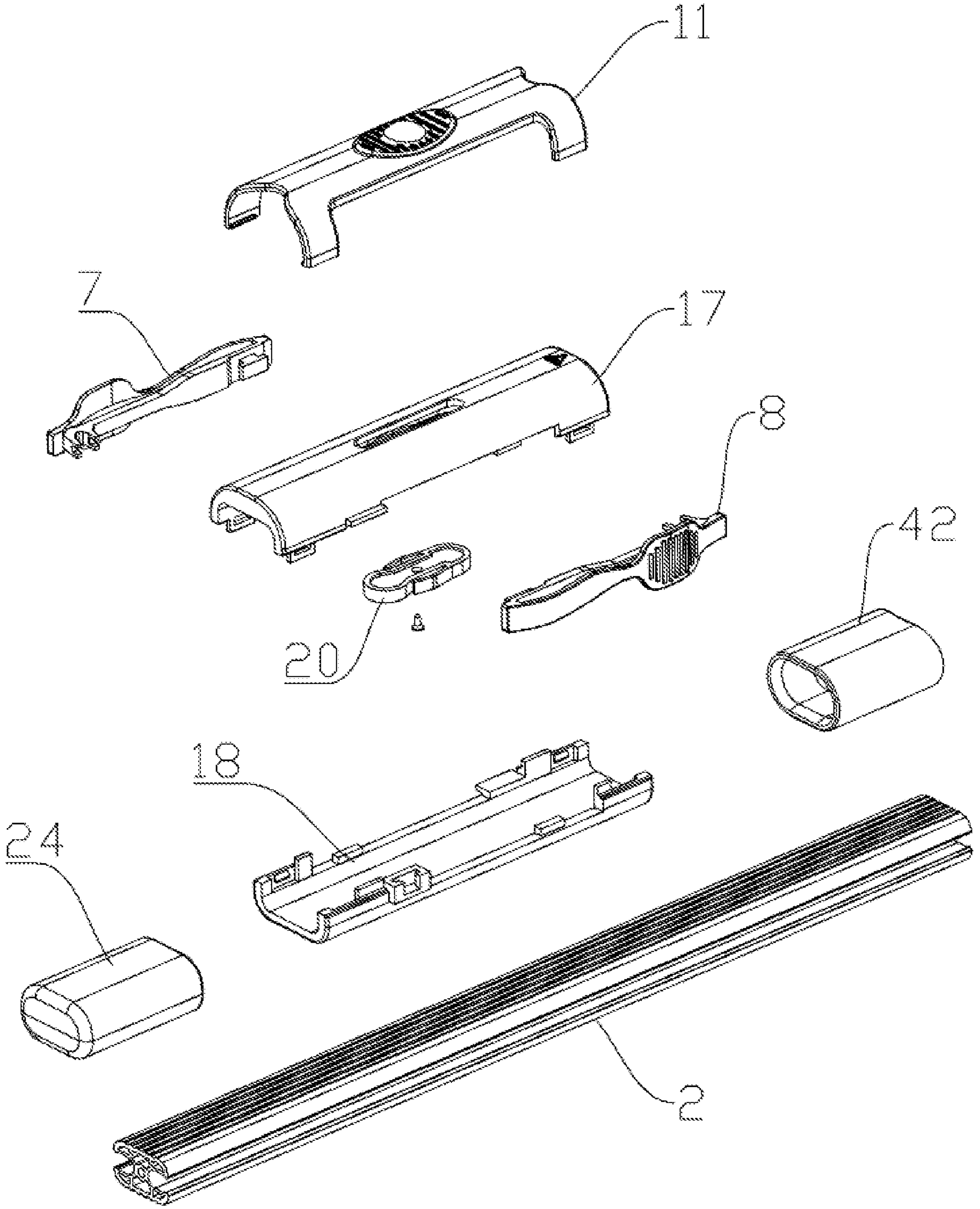
FIG. 15 is an explosive view of Embodiment 2 of the present invention.
Figure 16:
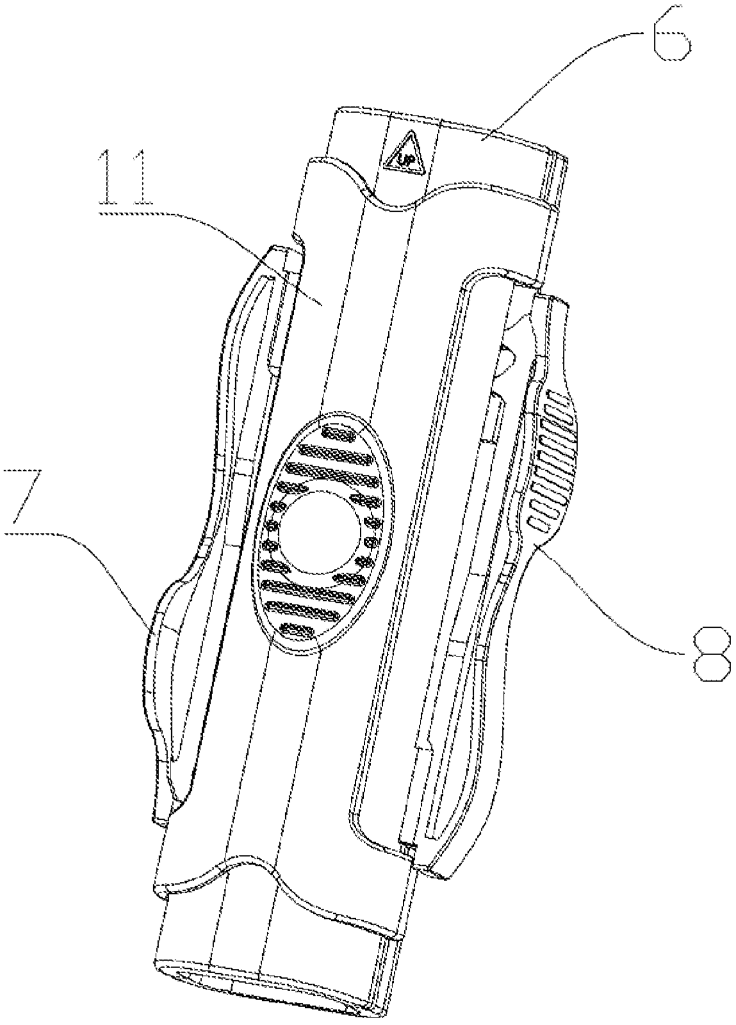
FIG. 16 is a stereogram of a lifting handle of Embodiment 2 of the present invention.
Figure 18:
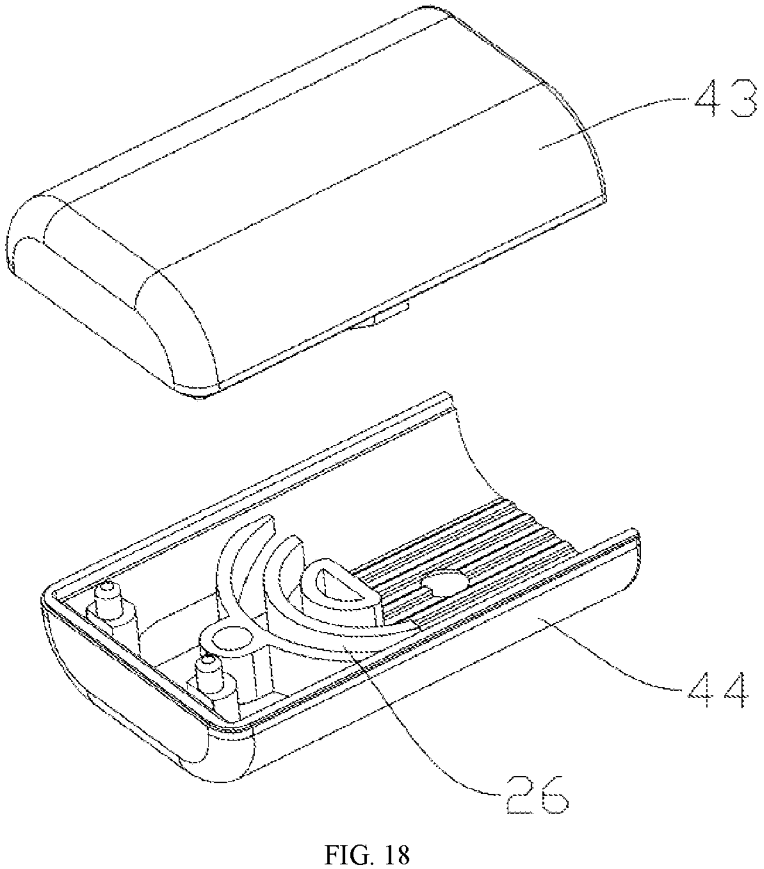
FIG. 18 is a stereogram of a guide piece of Embodiment 2 of the present invention.
Figure 19:
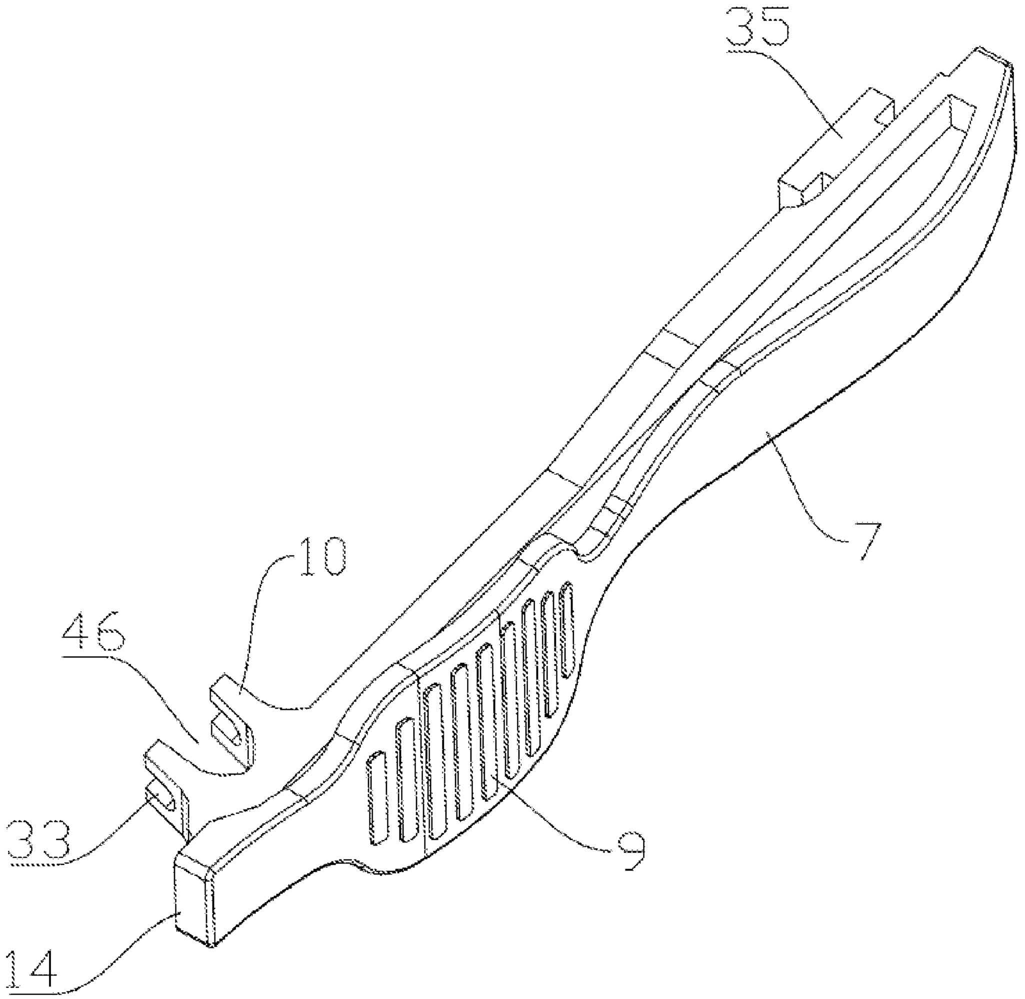
FIG. 19 is a stereogram of a first handle control piece of Embodiment 2 of the present invention.
Figure 20:
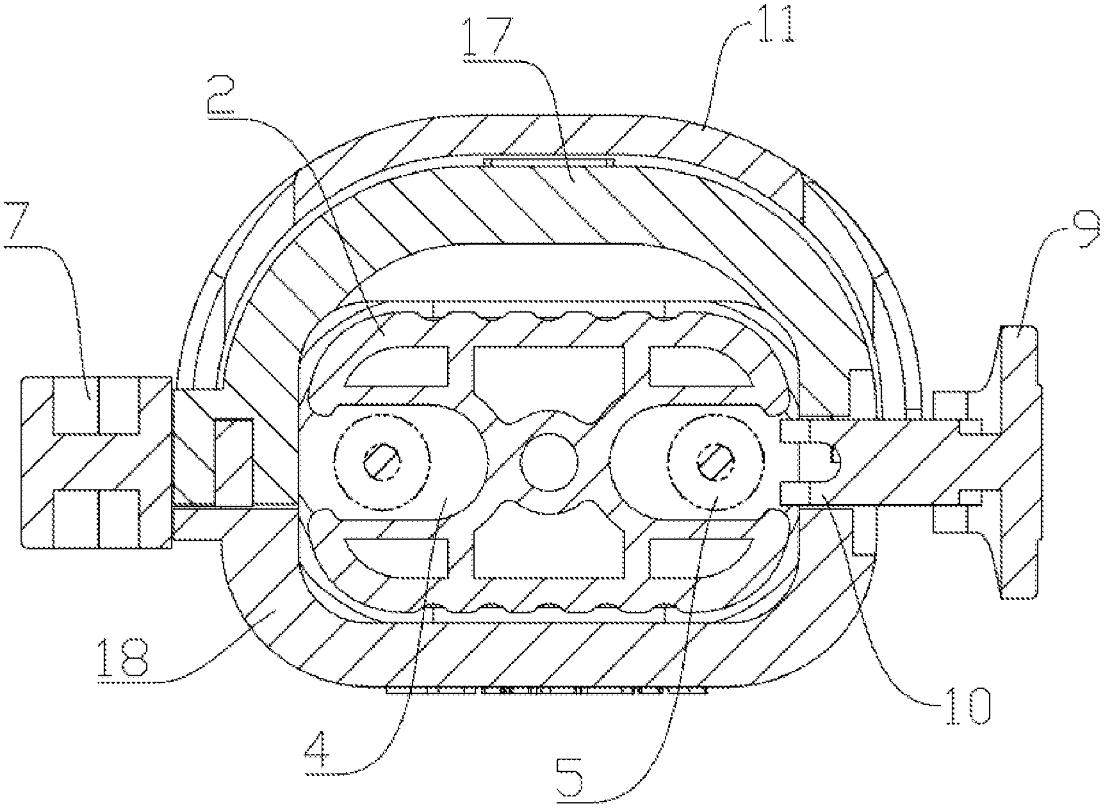
FIG. 20 is a sectional view of Embodiment 2 of the present invention.
Figure 21:
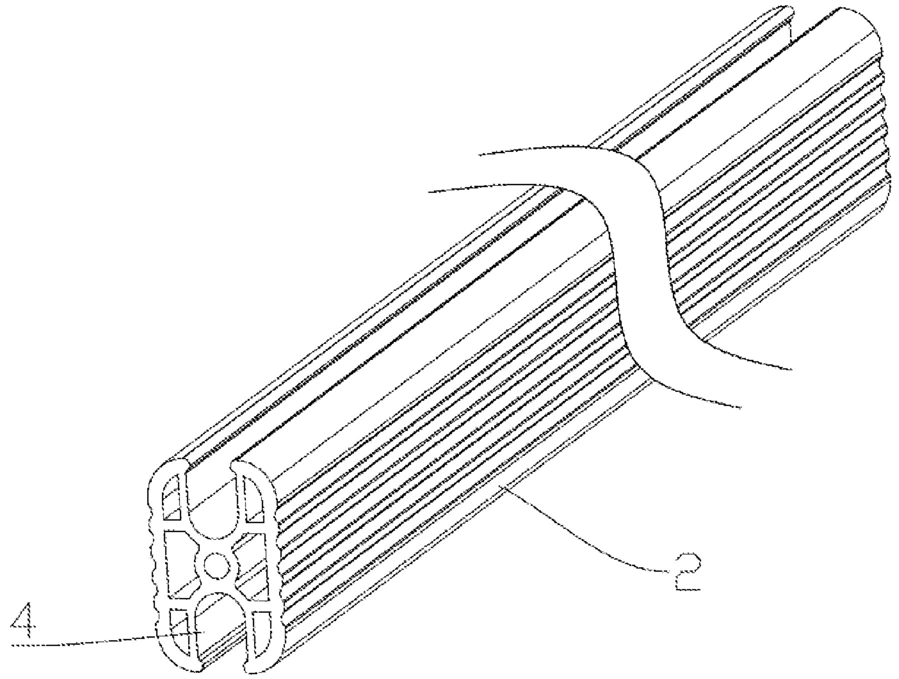
FIG. 21 is a stereogram of a guide rail rod body of Embodiment 2 of the present invention.

Referring FIG. 13-FIG. 21, the present embodiment differs from Embodiment 1 in that the traction piece 5 is a pull bead chain. Referring to FIG. 14 and FIG. 20, the pull bead chain includes beads and a chain for connecting the beads. The use principle of the pull bead chain is the same as that of the traction piece in Embodiment 1.

Referring to FIG. 18, an arc-shaped groove 26 through which the pull bead chain passes is disposed in the guide piece 24, and the whole pull bead chain takes the shape of a closed ring, with one end wound around the roller blind head 1 and the other end winding through the arc-shaped groove 26 in the guide piece 24.

Referring to FIG. 19, each clamping portion 10 is provided with at least one wire clamping groove 33. In the present embodiment, each clamping portion 10 is provided with two wire clamping grooves 33, and a radially disposed placing groove 46 is formed between the two wire clamping grooves 33. In conjunction with FIG. 14 and FIG. 20, when the clamping portion 10 clamps the pull bead chain, the beads of the pull bead chain are clamped in the placing groove 46, and the chain is clamped by the wire clamping grooves 33.

Figure 17:
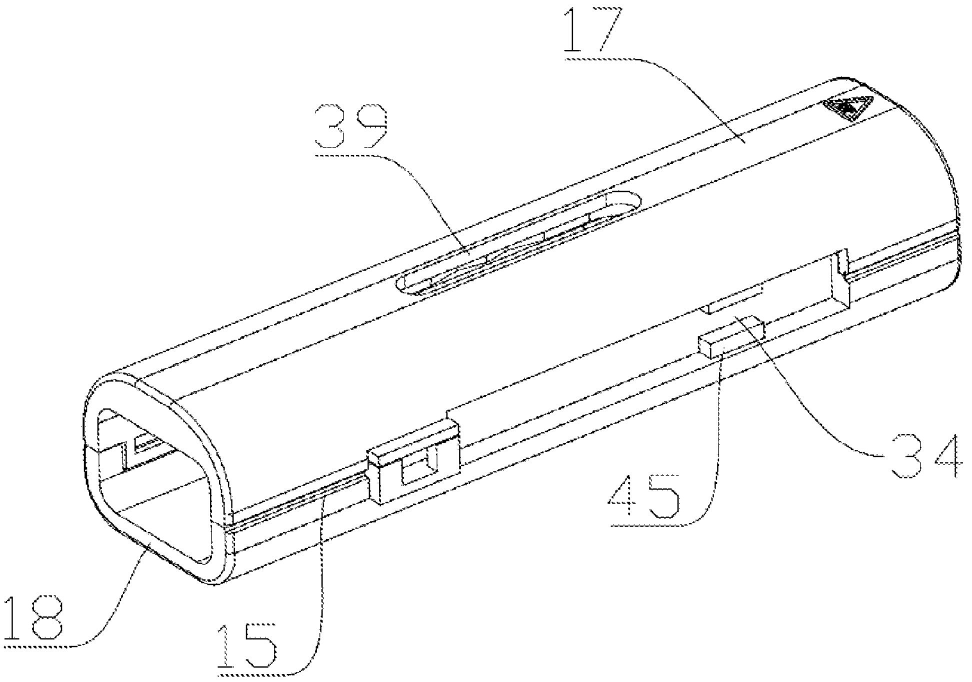
FIG. 17 is a stereogram of a housing of Embodiment 2 of the present invention.

Referring to FIG. 17, guide sliding grooves 34 are formed on two sides of the housing 6, and the clamping portions 10 are movably mounted in the guide sliding grooves 34, which can play a role in preventing the clamping portions 10 from swaying. Specifically, the upper cover 17 and the lower cover 18 are correspondingly provided with protrusion portions 45, and the guide sliding grooves 34 are formed between the protrusion portions 45.

Embodiment 3

The embodiment provides a use method of a child-resistant roller blind lifting fixing rod, realized based on the child-resistant roller blind lifting fixing rod of Embodiment 1 or Embodiment 2.

When the roller blind head needs to be adjusted clockwise (corresponding to rising or falling of a roller blind), the use method specifically includes the following steps:

Step S101: sliding the sliding lock cover 11 of the lifting handle 3 upwards to enter the first lock position, and the lower stop end 13 of the sliding lock cover 11 being clamped with the stop flange 14 of the first handle control piece 7 such that the first handle control piece 7 cannot be triggered by an external force. Step S102: sliding the lifting handle 3 upwards to a position close to the upper end of the guide rail rod body 2. Step S103: continuously pressing the triggering end 9 on the second handle control piece 8 of the lifting handle 3, and clamping the traction piece 5 in the corresponding accommodating cavity 4 of the guide rail rod body 2 by the clamping portion 10 of the second handle control piece 8. Step S104: pulling down the whole lifting handle 3 to pull the traction piece 5 on the second handle control piece 8 side to move downwards, thus achieving clockwise adjustment of the roller blind head. Step S105: after adjusting in place, releasing the lifting handle 3, and the lifting handle 3 falling to the lower end of the guide rail rod body 2 under the effect of gravity.

Step S102-step S104 can be repeated for continuous adjustment.

When the roller blind head needs to be adjusted counterclockwise (corresponding to falling or rising of the roller blind), the use method specifically includes the following steps:

Step S201: sliding the sliding lock cover 11 downwards to enter the second lock position, and the upper stop end 12 of the sliding lock cover 11 being clamped with the stop flange 14 of the second handle control piece 8 such that the second handle control piece 8 cannot be triggered by an external force. Step S202: sliding the lifting handle 3 upwards to a position close to the upper end of the guide rail rod body 2.

Step S203: continuously pressing the triggering end 9 on the first handle control piece 7, and clamping the traction piece 5 in the corresponding accommodating cavity 4 of the guide rail rod body 2 by the clamping portion 10 of the first handle control piece 7.

Step S204: pulling down the whole lifting handle 3 to pull the traction piece 5 on the first handle control piece 7 side to move downwards, thus achieving counterclockwise adjustment of the roller blind head. Step S205: after adjusting in place, releasing the lifting handle 3, and the lifting handle 3 falling to the lower end of the guide rail rod body 2 under the effect of gravity.

Step S202-step S204 can be repeated for continuously adjustment.

FIG. 12 shows a schematic diagram of the use of the child-resistant roller blind lifting fixing rod. During the whole process of use, the pull rope or pull bead chain is hidden in the guide rail rod body 2, so that children will not accidentally touch the pull rope or the pull bead chain, thus avoiding potential safety hazards.

The above are only the preferred embodiments of the present invention. It should be pointed out that those skilled in the art, without departing from the technical principles of the present invention, can make several improvements and modifications, which also fall within the scope of protection of the present invention.

What is claimed:

1. A child-resistant roller blind lifting fixing rod, used for connecting an external roller blind head (1) comprising a traction piece (5) which is a pull rope, comprising a guide rail rod body (2) and a lifting handle (3), wherein accommodating cavities (4) are disposed on two sides of the guide rail rod body (2) along an axial direction in a cut-through manner each accommodating cavity is configured to accommodate a portion of the traction piece (5), the lifting handle (3) comprises a housing (6) slidably sleeved on the guide rail rod body (2) along the axial direction and a first handle control piece (7) and a second handle control piece (8) correspondingly mounted on two sides of the housing (6), the housing (6) further comprises an inner side facing towards an interior of the housing (6), in a direction perpendicular to the two sides of the housing (6) and the axial direction, and an outer side positioned opposite to the inner side, and each of the first handle control piece (7) and the second handle control piece (8) is provided with a triggering end (9) and a clamping portion (10) corresponding to the traction piece (5);

when in use, by triggering the triggering end (9) of the first handle control piece (7) or the second handle control piece (8), the clamping portion (10) clamps the traction piece (5), and by pulling down the whole lifting handle (3), the traction piece (5) on the corresponding triggering end (9) side is driven to move downwards, so that counterclockwise or clockwise rotation of the roller blind head (1) is achieved;

wherein a guide piece (24) used for guiding the traction piece (5) is disposed at the lower end of the guide rail rod body (2); and wherein a guide roller (25) is mounted in the guide piece (24), wire holes (27) through which the pull rope passes are correspondingly formed in the housing (6) along the axial direction, the wire holes (27) having an opening facing towards a direction of the inner side of the housing (6) and a wire clamping cavity (28) is formed on one side of each wire hole (27), the wire clamping cavity (28) having a surface facing towards a direction opposite to the one side of each wire hole (27); and when the triggering end (9) is pressed, the pull rope is fixed in the wire clamping cavity (28) by the clamping portion (10).

2. The child-resistant roller blind lifting fixing rod according to claim 1, wherein a fixed flange (35) is disposed at one end of each of the first handle control piece (7) and the second handle control piece (8), the housing (6) is provided with fixed clamping grooves (36) used for placing the fixed flanges (35), a sheath (42) is mounted at the upper end of the guide rod body (2), the upper cover (17) is provided with clamping grooves (37), the lower cover (18) is provided with clamping protrusions (38) corresponding to the clamping grooves (37), and a receding groove (39) is disposed at the bottom of the mounting groove (19) in a cut-through manner.

3. The child-resistant roller blind lifting fixing rod according to claim 1, wherein a width of the triggering end (9) of the first handle control piece (7) is greater than a width of other portions of the first handle control piece (7), and a width of the triggering end (9) of the second handle control piece (8) is greater than a width of other portions of the second handle control piece (8).

4. The child-resistant roller blind lifting fixing rod according to claim 1, wherein a sliding lock cover (11) is slidably mounted on the housing (6) along the axial direction, and upper stop ends (12) and lower stop ends (13) corresponding to the triggering ends (9) are respectively disposed at upper and lower ends of the sliding lock cover (11).

5. The child-resistant roller blind lifting fixing rod according to claim 4, wherein concave sliding grooves (15) are formed on two sides of the housing (6), and the sliding lock cover (11) is correspondingly provided with slider protrusions (16) matched with the concave sliding grooves (15).

6. The child-resistant roller blind lifting fixing rod according to claim 4, wherein a stop flange (14) is formed on the triggering end (9) side of each of the first handle control piece (7) and the second handle control piece (8);

the sliding lock cover (11) is provided with a first lock position and a second lock position;

when the sliding lock cover (11) slides upwards to enter the first lock position, the lower stop end (13) is clamped with the stop flange (14) of the first handle control piece (7); and when the sliding lock cover (11) slides downwards to enter the second lock position, the upper stop end (12) is clamped with the stop flange (14) of the second handle control piece (8).

7. The child-resistant roller blind lifting fixing rod according to claim 6, wherein the housing (6) comprises an upper cover (17) and a lower cover (18) buckled together, the sliding lock cover (11) is mounted on the upper cover (17), a mounting groove (19) is disposed on the inner side of the upper cover (17), a fixing piece (20) is slidably mounted in the mounting groove (19), the fixing piece (20) is fixedly connected to the sliding lock cover (11), elastic clamping blocks (21) are disposed on two sides of the fixing piece (20), the mounting groove (19) is provided with a first positioning clamping groove (22) and a second positioning clamping groove (23) correspondingly clamped with the elastic clamping blocks (21), when the sliding lock cover (11) is in the first lock position, the elastic clamping blocks (21) are clamped in the first positioning clamping groove (22), and when the sliding lock cover (11) is in the second lock position, the elastic clamping blocks (21) are clamped in the second positioning clamping groove (23).

8. A use method of a child-resistant roller blind lifting fixing rod, realized based on the child-resistant roller blind lifting fixing rod according to claim 7, wherein in response to the roller blind head being adjusted clockwise, the use method comprises the following steps:

step S101: sliding the sliding lock cover (11) of the lifting handle (3) upwards to enter the first lock position, and the lower stop end (13) of the sliding lock cover (11) being clamped with the stop flange (14) of the first handle control piece (7) such that the first handle control piece (7) cannot be triggered by an external force;

step S102: sliding the lifting handle (3) upwards to a position close to the upper end of the guide rail rod body (2);

step S103: continuously pressing the triggering end (9) on the second handle control piece (8) of the lifting handle (3), and clamping the traction piece (5) in the corresponding accommodating cavity (4) of the guide rail rod body (2) by the clamping portion (10) of the second handle control piece (8);

step S104: pulling down the whole lifting handle (3) to pull the traction piece (5) on the second handle control piece (8) side to move downwards, thus achieving clockwise adjustment of the roller blind head; and step S105: after adjusting in place, releasing the lifting handle (3), and the lifting handle (3) falling to the lower end of the guide rail rod body (2) under the effect of gravity; and in response to the roller blind head being adjusted counterclockwise, the use method comprises the following steps:

step S201: sliding the sliding lock cover (11) downwards to enter the second lock position, and the upper stop end (12) of the sliding lock cover (11) being clamped with the stop flange (14) of the second handle control piece (8) such that the second handle control piece (8) cannot be triggered by an external force;

step S202: sliding the lifting handle (3) upwards to a position close to the upper end of the guide rail rod body (2);

step S203: continuously pressing the triggering end (9) on the first handle control piece (7), and clamping the traction piece (5) in the corresponding accommodating cavity (4) of the guide rail rod body (2) by the clamping portion (10) of the first handle control piece (7);

step S204: pulling down the whole lifting handle (3) to pull the traction piece (5) on the first handle control piece (7) side to move downwards, thus achieving counterclockwise adjustment of the roller blind head; and step S205: after adjusting in place, releasing the lifting handle (3), and the lifting handle (3) falling to the lower end of the guide rail rod body (2) under the effect of gravity.

9. The child-resistant roller blind lifting fixing rod according to claim 1, wherein a first wire clamping protrusion (29) is disposed on the surface of each wire clamping cavity (28), each clamping portion (10) is provided with a wire clamping block (30), a second wire clamping protrusion (31) is disposed on one side of each wire clamping block (30), guide blocks (32) are formed in the housing (6), protruding towards a direction of the inner side of the housing (6), the guide blocks (32) are placed in the accommodating cavities (4), and the wire holes (27) and the wire clamping cavities (28) are disposed on the guide blocks (32).

10. The child-resistant roller blind lifting fixing rod according to claim 9, wherein a guide rail guide groove (40) is formed on one side of each guide block (32), having an opening facing towards a direction of the outer side of the housing (6), a guide rail flange (41) is formed at an opening of each accommodating cavity (4), and the guide rail flange (41) and the guide rail guide groove (40) are slidably matched with each other.

* * * * *